United States Patent
Yang (10) Patent No.: US 9,903,665 B2
(45) Date of Patent: Feb. 27, 2018

(54) HEAT DISSIPATION UNIT AND THERMAL MODULE THEREOF

(71) Applicant: Asia Vital Components Co., Ltd., New Taipei (TW)

(72) Inventor: Hsiu-Wei Yang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 355 days.

(21) Appl. No.: 14/624,155

(22) Filed: Feb. 17, 2015

(65) Prior Publication Data
US 2015/0176919 A1 Jun. 25, 2015

Related U.S. Application Data (60) Continuation of application No. 14/268,200, filed on May 2, 2014, now abandoned, which is a division of application No. 13/176,198, filed on Jul. 5, 2011, now abandoned.

(51) Int. Cl.
| | | |
|---|---|---|
| F28D 15/02 | (2006.01) | |
| F28D 15/04 | (2006.01) | |
| B23P 15/26 | (2006.01) | |
| F28F 13/18 | (2006.01) | |

(52) U.S. Cl.
CPC ............ *F28D 15/046* (2013.01); *B23P 15/26* (2013.01); *F28D 15/0266* (2013.01); *F28F 13/182* (2013.01); *F28F 2245/02* (2013.01); *F28F 2245/04* (2013.01); *Y10T 29/4935* (2015.01); *Y10T 29/49353* (2015.01)

(58) Field of Classification Search
CPC .. F28D 15/046; F28D 15/0266; F28F 13/182; F28F 2245/04; F28F 2245/02; B23P 15/26; Y10T 29/49353; Y10T 29/4935
See application file for complete search history.

(56) References Cited

U.S. PATENT DOCUMENTS

| | | | |
|---|---|---|---|
| 2004/0104012 A1 | 6/2004 | Zhou et al. | |
| 2006/0137859 A1 | 6/2006 | Lin | |
| 2006/0151153 A1 | 7/2006 | Chen | |
| 2006/0272798 A1 | 12/2006 | Liu et al. | |
| 2010/0033933 A1* | 2/2010 | Hashimoto | ............ H05K 7/208 361/700 |
| 2010/0186931 A1 | 7/2010 | Obara et al. | |
| 2010/0221627 A1 | 9/2010 | Nakakubo | |

(Continued)

FOREIGN PATENT DOCUMENTS

| | | |
|---|---|---|
| TW | 1233977 B | 6/2005 |
| TW | 200519345 A | 6/2005 |
| TW | 200537067 A | 11/2005 |

(Continued)

*Primary Examiner* — Richard Chang
(74) *Attorney, Agent, or Firm* — C. G. Mersereau; Nikolai & Mersereau, P.A.

(57) ABSTRACT

A heat dissipation unit and a thermal module thereof. The heat dissipation unit includes a metal main body having a chamber, an oxide coating and a working fluid. The oxide coating is coated on wall surface of the chamber instead of capillary structure. The oxide coating serves to enhance vapor/liquid circulation efficiency of the working fluid in the chamber of the heat dissipation unit so as to increase heat dissipation efficiency.

3 Claims, 7 Drawing Sheets

B-B Profile (56) References Cited

U.S. PATENT DOCUMENTS

2011/0017431 A1   1/2011  Yang et al.

FOREIGN PATENT DOCUMENTS

| TW | 200628745 A | 8/2006 |
|----|-------------|--------|
| TW | 1262285 B | 9/2006 |
| TW | 200723623 A | 6/2007 |
| TW | 1295363 B | 4/2008 |
| WO | 2008153071 A1 | 12/2008 |

\* cited by examiner

HEAT DISSIPATION UNIT AND THERMAL MODULE THEREOF

CROSS-REFERENCE TO RELATED APPLICATIONS

The present application is a continuation of U.S. patent application Ser. No. 14/268,200, filed on May 2, 2014, titled Heat Dissipation Unit and Manufacturing Method Thereof and Thermal Module Thereof, listing Hsiu-Wei Yang as inventor, which is a divisional of U.S. patent application Ser. No. 13/176,198, filed on Jul. 5, 2011, titled Heat Dissipation Unit and Manufacturing Method Thereof and Thermal Module Thereof, also listing Hsiu-Wei Yang as inventor. Both of the above applications are incorporated herein by reference in their entirety.

BACKGROUND OF THE INVENTION

1. Field of the Invention

The present invention relates generally to a heat dissipation unit and a thermal module thereof. The heat dissipation unit includes a metal main body having a chamber. An oxide coating is deposited on wall surface of the chamber instead of capillary structure. The oxide coating serves to enhance vapor/liquid circulation efficiency of the working fluid in the chamber of the heat dissipation unit so as to increase heat dissipation efficiency.

2. Description of the Related Art

It is known that in operation, the electronic components of an electronic device generate heat at the same time. Most of the heat is generated by operation chips in operation. Following the more and more increased operation performance of the chips, the power of the chips has been up to 100 watts. The heat must be dissipated by means of a heat dissipation unit at high efficiency. Otherwise, the temperature of the chips may rise to over 100° C.

Most of the current chips are made of semiconductor such as silicon. The chip has numerous metal leads and insulation films inside. The expansion coefficients of these two materials are several times different from each other. As a result, when the chip repeatedly operates at a temperature over 90° C., the chip often eventually cracks and damages.

In order to avoid burnout of the chip due to overheating, the waste heat generated by the current must be dissipated in time. Therefore, the chip is often in contact with a copper plate or embedded in a metal-based ceramic sintered body such as aluminum-based silicon carbide, which currently has highest heat dissipation efficiency, for dissipating the heat. In addition, a heat dissipation unit is provided to help in increasing the heat dissipation efficiency so as to avoid burnout of the chip due to too high temperature. The heat dissipation unit is generally a radiating fin assembly, a heat sink or a heat pipe. Moreover, a cooling fan is usually provided to carry away the heat by forced convection so as to dissipate the heat and lower the temperature.

There is a trend to thin the electronic device. To catch up this trend, the heat dissipation unit used in the electronic device must be thinned in accordance with the requirement of miniaturization. However, while reducing the thickness of the heat dissipation unit, the internal passage for the vapor and space for the capillary structure of the heat dissipation unit must be preserved. This makes it quite difficult to achieve the object of miniaturization of the heat dissipation unit.

Furthermore, sintered powder body and mesh body are currently most popularly used in the heat pipe as the capillary structure. Such structure has some shortcomings. For example, after thinned, the internal vapor chamber of the heat pipe is completely narrowed. This deteriorates the flowability of the vapor and affects vapor/liquid circulation of the working fluid. As a result, the heat dissipation unit will have lowered heat dissipation efficiency or even fail.

Also, when manufacturing the heat dissipation unit by means of pressing, the internal capillary structure is subject to damage to lead to a defective product.

According to the above, the conventional heat dissipation unit has the following shortcomings:
1. The vapor/liquid working fluid has poor flowability.
2. It is difficult to process the conventional heat dissipation unit.
3. The ratio of defective products is higher.

SUMMARY OF THE INVENTION

A primary object of the present invention is to provide a heat dissipation unit. An oxide coating is deposited on wall surface of the chamber of the heat dissipation unit instead of capillary structure to enhance vapor/liquid circulation efficiency of working fluid.

A still further object of the present invention is to provide a thermal module including a heat dissipation unit with higher vapor/liquid circulation efficiency of working fluid.

To achieve the above and other objects, the heat dissipation unit of the present invention includes a metal main body having a chamber, an oxide coating and a working fluid. The oxide coating is coated on wall surface of the chamber.

The manufacturing method of the heat dissipation unit of the present invention includes steps of: preparing a heat dissipation unit with a chamber; coating wall surface of the chamber of the heat dissipation unit with at least one layer of oxide coating; vacuuming the heat dissipation unit and filling working fluid into the chamber; and sealing the heat dissipation unit.

The thermal module of the present invention includes an evaporation chamber body and a heat dissipation unit.

The evaporation chamber body has a main chamber, an inlet and an outlet. The heat dissipation unit includes a metal main body having a chamber and an oxide coating. The oxide coating is coated on wall surface of the chamber. A first end of the heat dissipation unit is connected to the inlet of the evaporation chamber body, while a second end of the heat dissipation unit is connected to the outlet of the evaporation chamber body.

According to the above arrangement, in the heat dissipation unit of the present invention, the resistance against the circulation of the working fluid in the chamber is reduced so that the vapor/liquid circulation efficiency of the working fluid is enhanced to increase heat dissipation efficiency. Moreover, it is easier to manufacture the heat dissipation unit so that the ratio of defective products is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
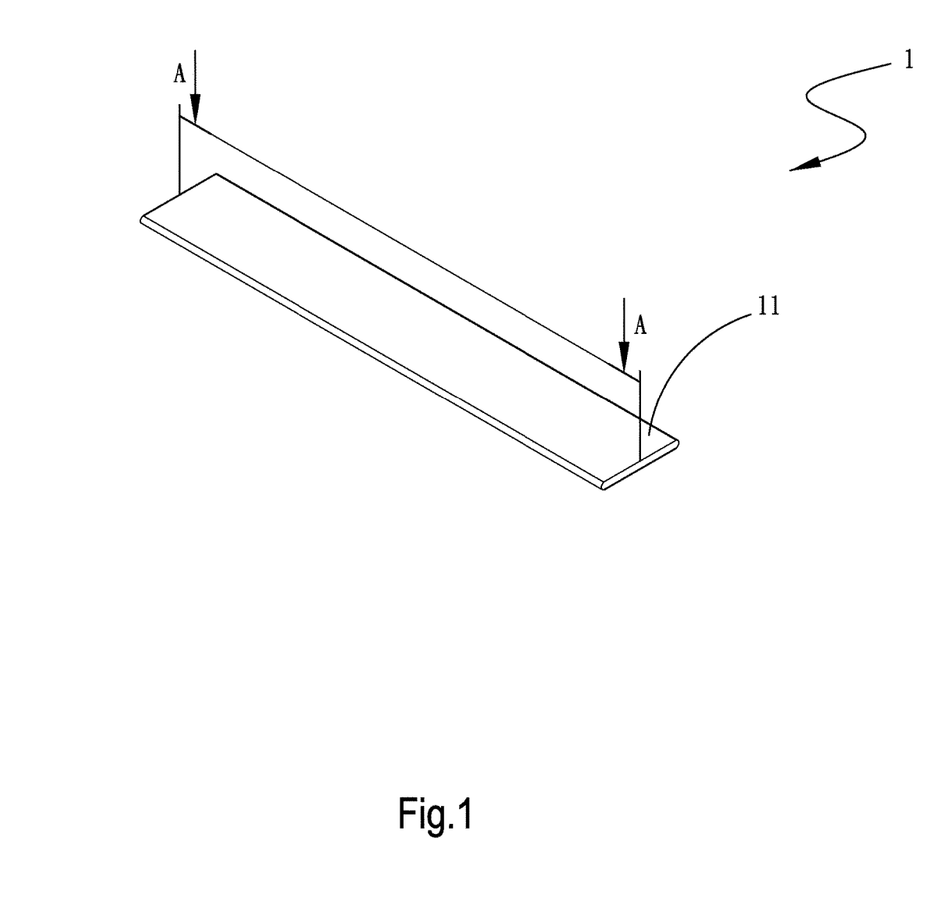
FIG. 1 is a perspective view of a first embodiment of the heat dissipation unit of the present invention.
Figure 2:
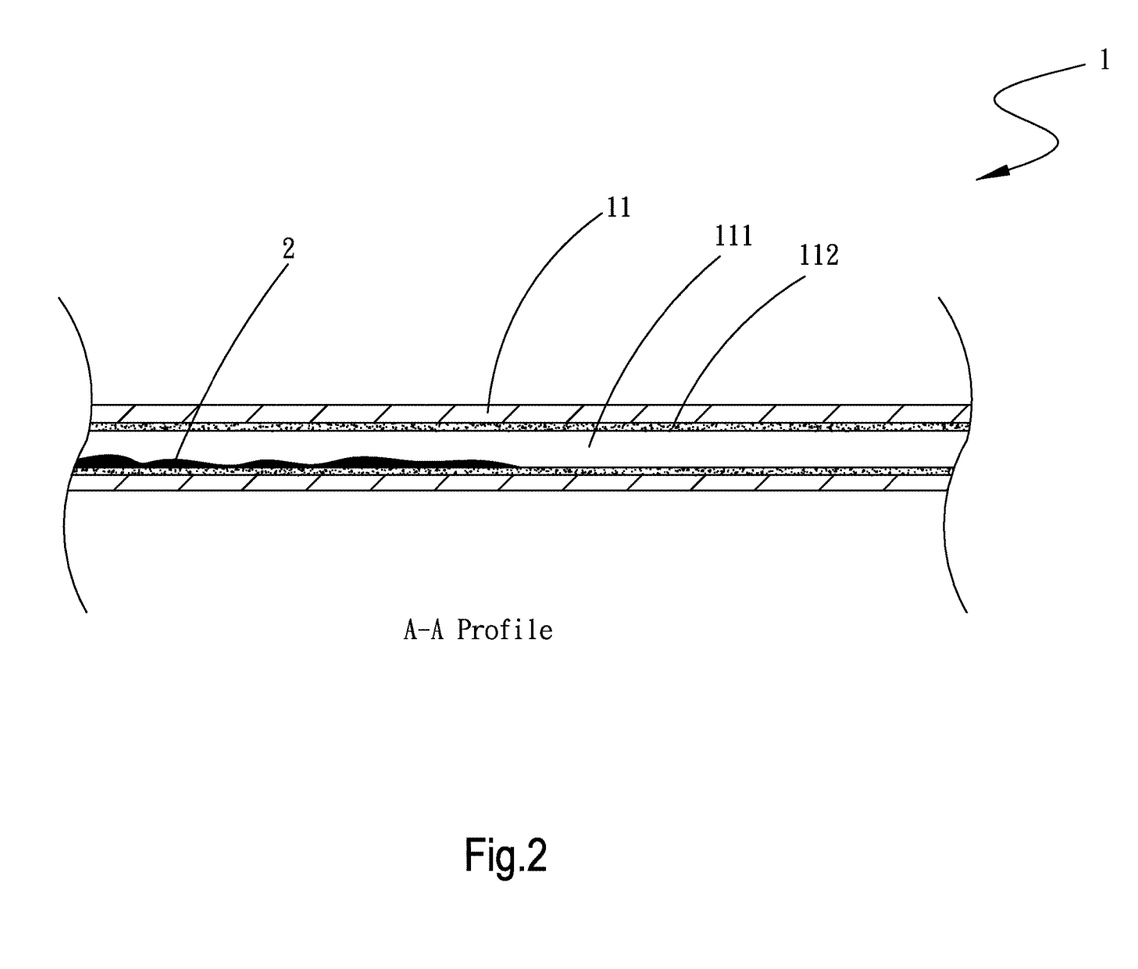
FIG. 2 is a sectional view taken along line A-A of FIG. 1.

Please refer to FIGS. 1 and 2. FIG. 1 is a perspective view of a first embodiment of the heat dissipation unit of the present invention. FIG. 2 is a sectional view thereof. According to the first embodiment, the heat dissipation unit 1 of the present invention includes a metal main body 11.

The metal main body 11 has a chamber 111, an oxide coating 112 and a working fluid 2. The oxide coating 112 is coated on wall surface of the chamber 111.

The metal main body 11 is made of a material selected from a group consisting of copper, aluminum, nickel and stainless steel.

The metal main body 11 can be any of heat pipe, heat spreader, thin heat pipe and flat-plate heat pipe. In this embodiment, the metal main body 11 is, but not limited to, a thin heat pipe. The oxide coating 112 is coated on the wall surface of the chamber 111 of the metal main body 11 for backflow of the working fluid 2. In this case, it is no more necessary to dispose capillary structure in the chamber 111 of the metal main body 11. This not only can lower the cost, but also can reduce the total thickness of the metal main body 11.

The oxide coating 112 is selected from a group consisting of silicon oxide ($SiO_2$), titanium oxide ($TiO_2$), aluminum oxide ($Al_2O_3$), zirconium oxide ($ZrO_2$), calcium oxide (CaO), potassium oxide ($K_2O$) and zinc oxide (ZnO).

The oxide coating 112 can be a hydrophobic coating or a hydrophilic coating. Alternatively, hydrophilic coating and hydrophilic coating can be respectively coated on different parts of the wall surface of the chamber 111.

Figure 3:
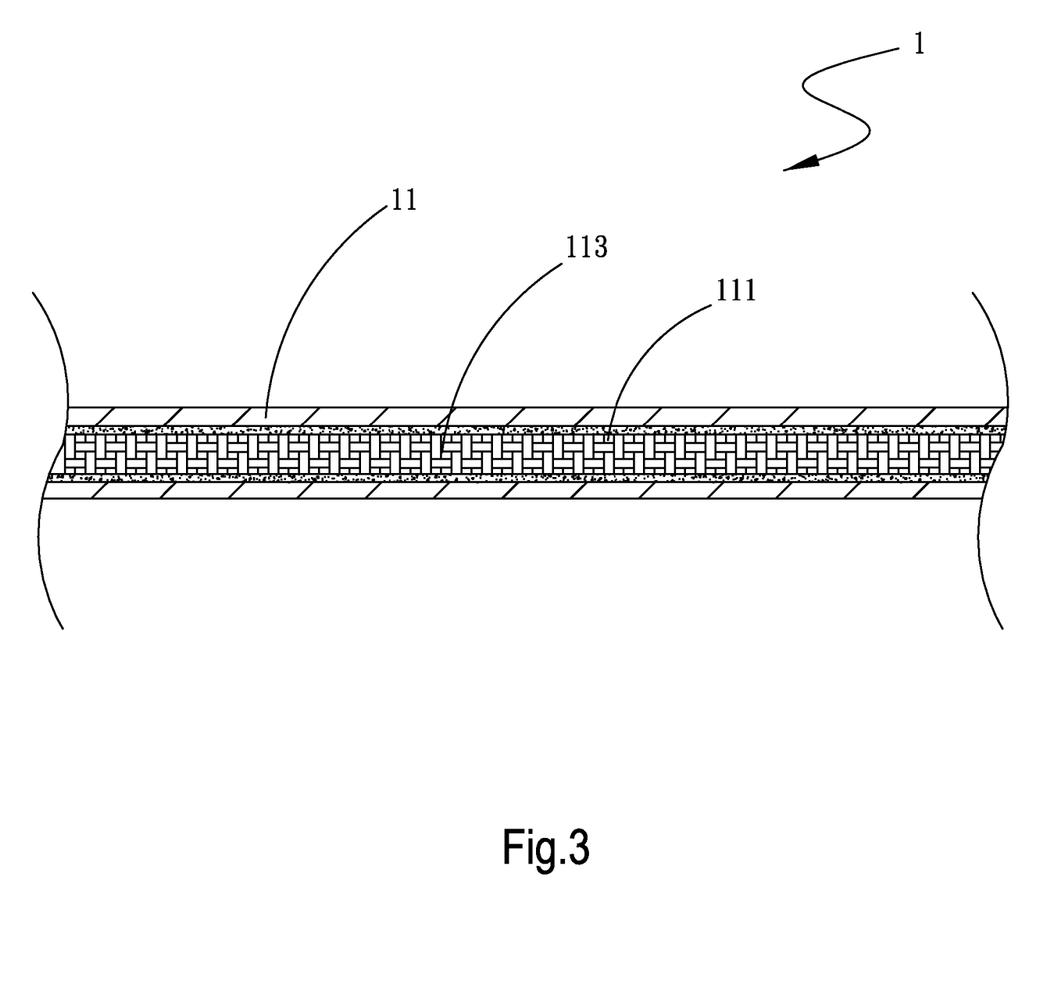
FIG. 3 is a sectional view of a second embodiment of the heat dissipation unit of the present invention.

Please refer to FIG. 3, which is a sectional view of a second embodiment of the heat dissipation unit of the present invention. In this embodiment, the metal main body 11 further has a capillary structure 113 disposed in the chamber 111. The capillary structure 113 is selected from a group consisting of sintered powder body, channeled body and mesh body. In this embodiment, the capillary structure is, but not limited to, a mesh body.

Figure 4:
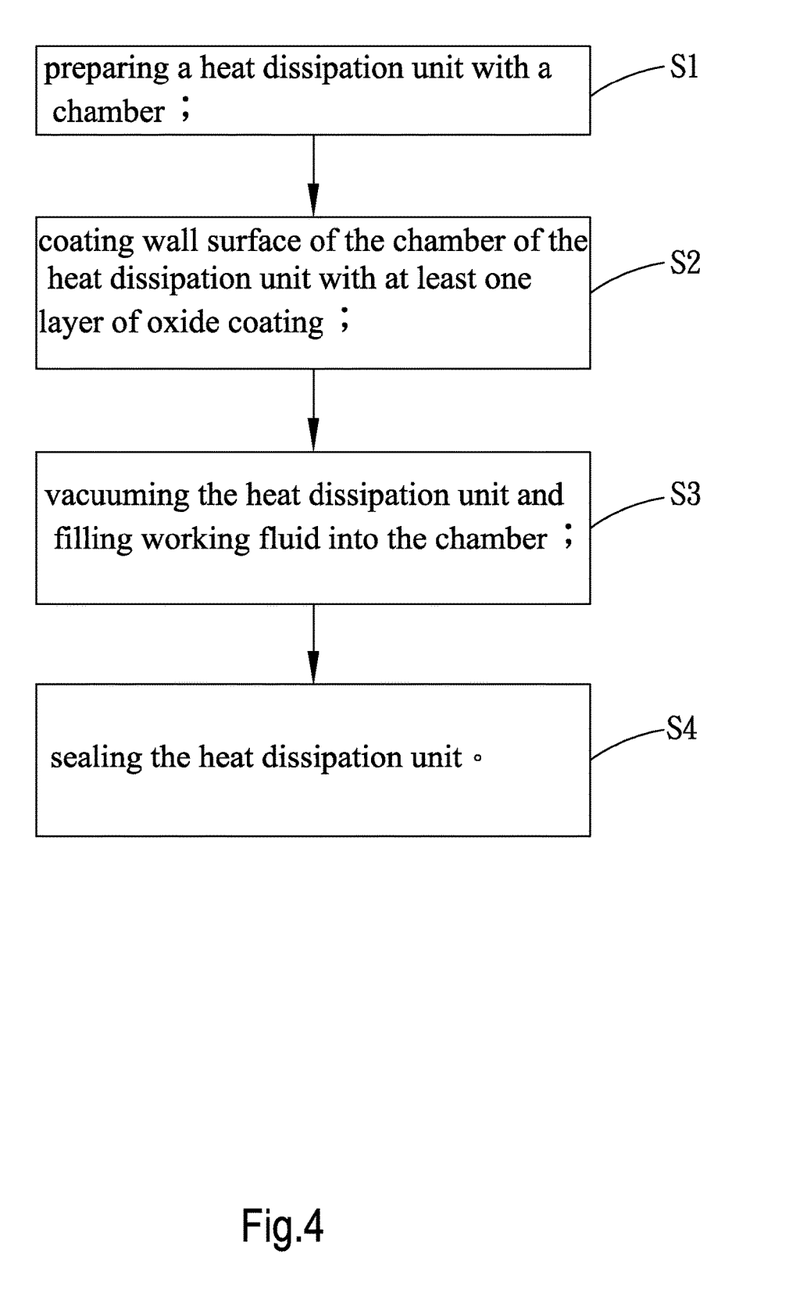
FIG. 4 is a flow chart of the manufacturing method of the heat dissipation unit of the present invention.
Figure 5:
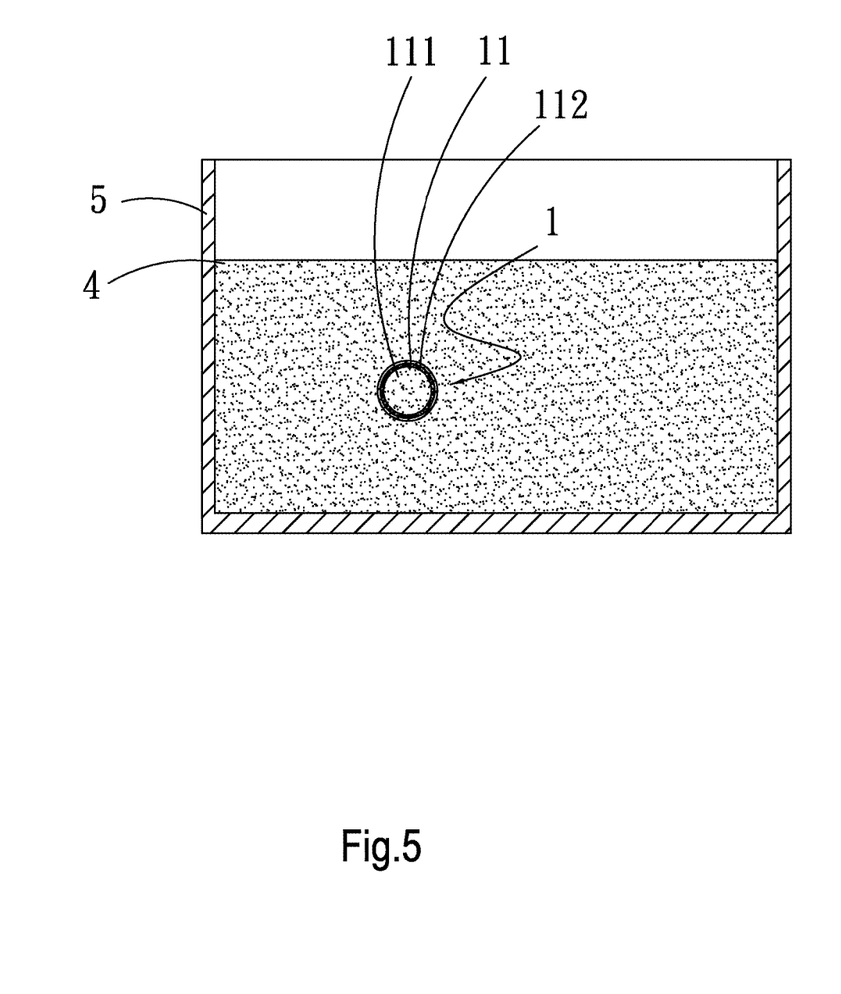
FIG. 5 shows a processing step of the manufacturing method of the heat dissipation unit of the present invention.

Please refer to FIG. 4, which is a flow chart of the manufacturing method of the heat dissipation unit of the present invention. Also referring to FIGS. 1 to 3 and 5, the manufacturing method of the heat dissipation unit of the present invention includes steps of:

S1: preparing a heat dissipation unit with a chamber, a heat dissipation unit 1 with a chamber 111 being prepared, the heat dissipation unit 1 being any of heat pipe, heat spreader, thin heat pipe and flat-plate heat pipe, the heat dissipation unit 1 being made of a material selected from a group consisting of copper, aluminum, nickel and stainless steel, in this embodiment, the heat dissipation unit being, but not limited to, a thin heat pipe;

S2: coating wall surface of the chamber of the heat dissipation unit with at least one layer of oxide coating, at least one layer of oxide coating 112 being coated on the wall surface of the chamber 111 of the heat dissipation unit 1, the oxide coating 112 being a hydrophobic coating or a hydrophilic coating, in this embodiment, the oxide coating 112 being, but not limited to, a hydrophilic coating for illustration purposes only, the oxide coating 112 being coated on the wall surface of the chamber 111 by means of physical vapor deposition (PVD), chemical vapor deposition (CVD) or sol-gel process, in this embodiment, the oxide coating being coated on the wall surface of the chamber 111 by means of, but not limited to, sol-gel process. The sol-gel process is selected from the group consisting of sol-gel dipping process, sol-gel deposition process, sol-gel spin-coating process, sol-gel painting-on process and sol-gel wetting process, in this embodiment, the sol-gel process being, but not limited to, sol-gel dipping process, in the sol-gel process, the material of the oxide coating 112 being, but not limited to, aluminum oxide ($Al_2O_3$) particles, the aluminum oxide ($Al_2O_3$) particles being dipped in an aqueous solution 4, then the aqueous solution 4 and the aluminum oxide ($Al_2O_3$) particles being together filled into a tank 5 and evenly mixed and diffused, then the heat dissipation unit 1 being entirely soaked into the aqueous solution 4 in the tank 5 and rested in the aqueous solution 4, finally, the heat dissipation unit 1 being taken out from the aqueous solution 4 or the aqueous solution 4 being completely drained out from the tank 5, whereby the aluminum oxide ($Al_2O_3$) particles adhere to the wall surface of the chamber 111 (as shown in FIG. 5) to form the oxide coating 112;

S3: vacuuming the heat dissipation unit and filling the working fluid into the chamber, the heat dissipation unit being vacuumed and the working fluid being filled into the chamber 111 of the heat dissipation unit 1; and S4: sealing the heat dissipation unit, the open end of the heat dissipation unit 1, which is vacuumed and filled with the working fluid 2 being sealed.

Figure 6:
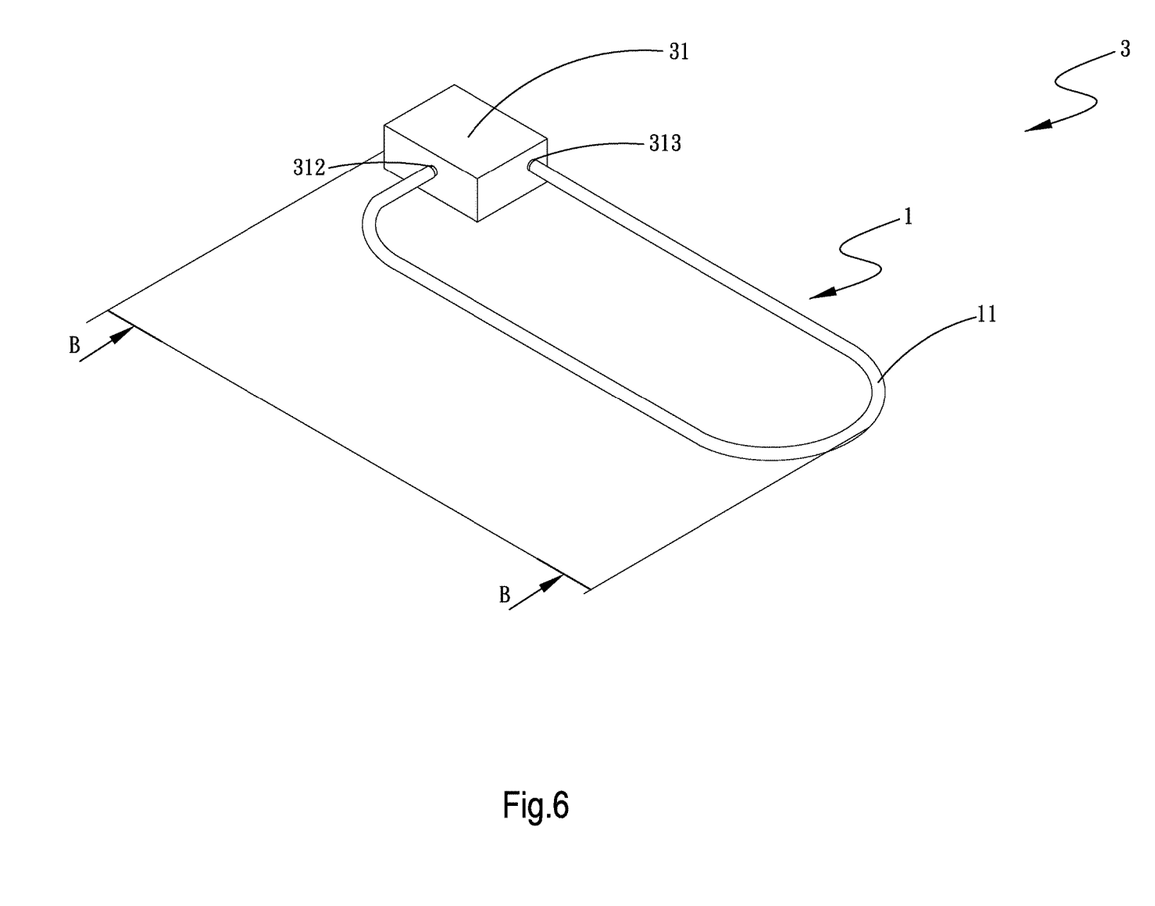
FIG. 6 is a perspective view of the thermal module of the present invention.
Figure 7:
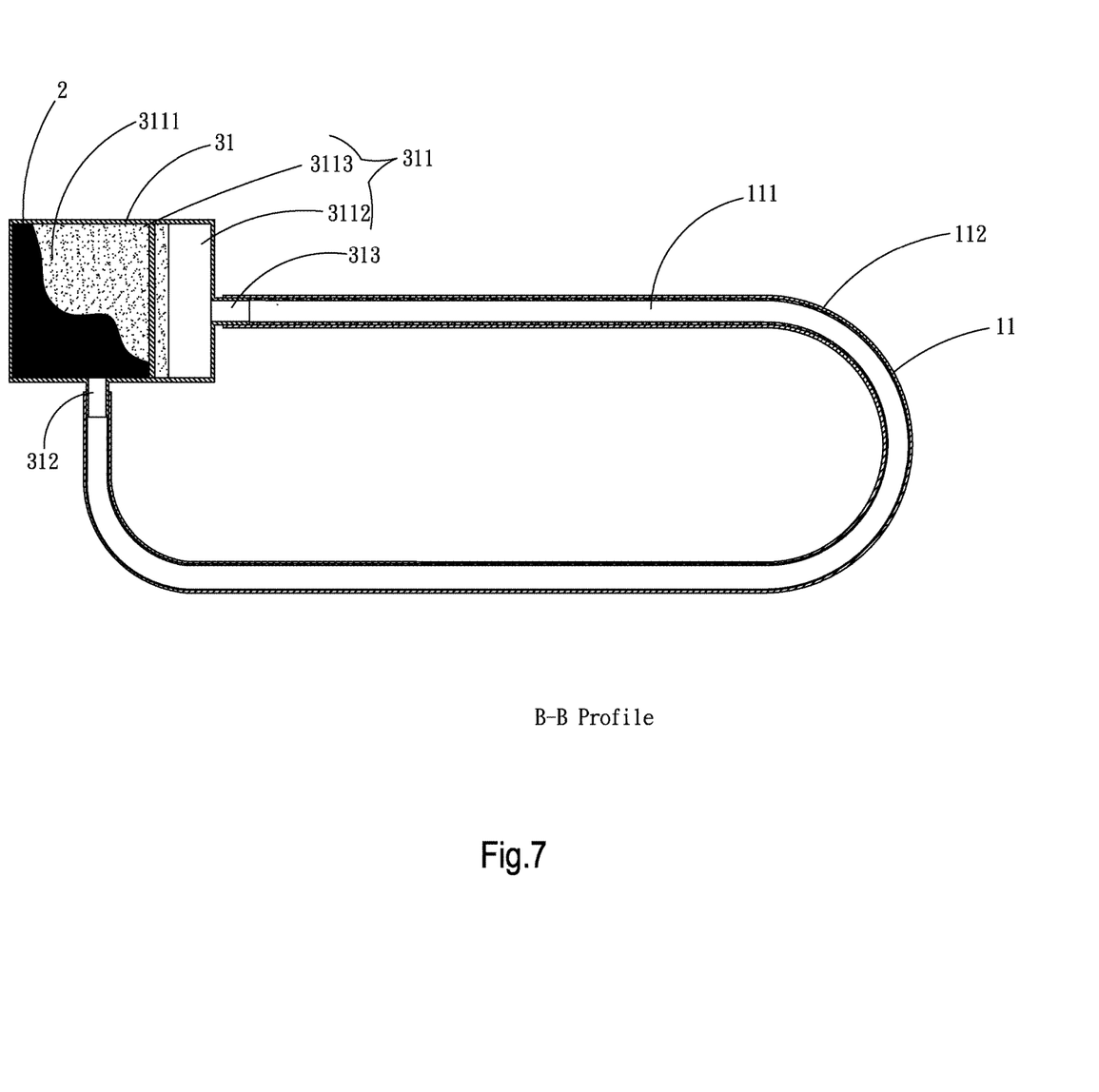
FIG. 7 is a sectional view taken along line B-B of FIG. 6.

Please refer to FIGS. 6 and 7. FIG. 6 is a perspective view of the thermal module of the present invention. FIG. 7 is a sectional view of the thermal module of the present invention. The thermal module 3 of the present invention includes an evaporation chamber body 31 and a heat dissipation unit 1.

The evaporation chamber body 31 has a main chamber 311, an inlet 312 and an outlet 313.

The main chamber 311 has a capillary structure 3111 and a working fluid 2. The main chamber 311 and the capillary structure 3111 together define an evaporation chamber 3112 and a condensation chamber 3113.

The heat dissipation unit 1 includes a metal main body 11 having a chamber 111 and an oxide coating 112 coated on wall surface of the chamber 111. A first end of the heat dissipation unit 1 is connected to the inlet 312, while a second end of the heat dissipation unit 1 is connected to the outlet 313.

The oxide coating 112 coated on the wall surface of the chamber 111 at the second end of the heat dissipation unit 1 is a hydrophobic coating, while the oxide coating 112 coated on the wall surface of the chamber 111 at the first end of the heat dissipation unit 1 is a hydrophilic coating.

The hydrophilic coating and hydrophilic coating serve to enhance vapor/liquid circulation efficiency of the working fluid 2 in the narrow chamber 111 so as to increase heat dissipation efficiency.

The above embodiments are only used to illustrate the present invention, not intended to limit the scope thereof. It is understood that many changes and modifications of the above embodiments can be made without departing from the spirit of the present invention. The scope of the present invention is limited only by the appended claims.

What is claimed is:

1. A thermal module comprising:
an evaporation chamber body having a main chamber, an inlet and an outlet;
a heat dissipation unit including a metal main body having a chamber and an oxide coating, the oxide coating being coated on wall surface of the chamber, a first end of the heat dissipation unit being connected to the inlet of the evaporation chamber body, while a second end of the heat dissipation unit being connected to the outlet of the evaporation chamber body;
wherein the oxide coating coated on the wall surface of the chamber at the second end of the heat dissipation unit is a hydrophobic coating;
wherein the oxide coating coated on the wall surface of the chamber at the first end of the heat dissipation unit is a hydrophilic coating; and
wherein the main chamber has a capillary structure and a working fluid, the main chamber and the capillary structure together defining an evaporation chamber and a condensation chamber.

2. A heat dissipation unit comprising a metal main body having a chamber, an oxide coating, a working fluid and a capillary structure being disposed in the chamber, the oxide coating being coated on wall surface of the chamber, the capillary structure being selected from a group consisting of sintered powder body, channeled body and mesh body; and
wherein the metal main body further comprises an evaporating section and a condensing section being defined in the chamber, and wherein the oxide coating on the evaporating section is a hydrophilic coating and the oxide coating on the condensing section is a hydrophobic coating, respectively.

3. The heat dissipation unit as claimed in claim 2, wherein the metal main body is selected from a group consisting of heat pipe, heat spreader, thin heat pipe and flat-plate heat pipe.

* * * * *